US009175499B2

(12) United States Patent
Huang et al.

(10) Patent No.: US 9,175,499 B2
(45) Date of Patent: Nov. 3, 2015

(54) HANDLE ASSEMBLY OF LOCK

(71) Applicant: TAIWAN FU HSING INDUSTRIAL CO., LTD., Kaohsiung (TW)

(72) Inventors: Chao-Ming Huang, Kaohsiung (TW); Wen-Chieh Lee, Kaohsiung (TW)

(73) Assignee: TAIWAN FU HSING INDUSTRIAL CO., LTD., Kaohsiung (TW)

( * ) Notice: Subject to any disclaimer, the term of this patent is extended or adjusted under 35 U.S.C. 154(b) by 0 days.

(21) Appl. No.: 14/180,551

(22) Filed: Feb. 14, 2014

(65) Prior Publication Data

US 2014/0290427 A1 Oct. 2, 2014

(30) Foreign Application Priority Data

Apr. 2, 2013 (TW) ............................ 102111958 A

(51) Int. Cl.

| | |
|---|---|
| ***B60R 25/02*** | (2013.01) |
| ***E05B 3/04*** | (2006.01) |
| ***E05B 17/20*** | (2006.01) |
| *E05B 3/06* | (2006.01) |
| *E05B 3/00* | (2006.01) |

(52) U.S. Cl.

CPC . *E05B 3/04* (2013.01); *E05B 3/003* (2013.01); *E05B 17/2084* (2013.01); *E05B 3/00* (2013.01); *E05B 3/06* (2013.01); *Y10T 74/20732* (2015.01)

(58) Field of Classification Search

CPC ............ E05B 13/10; E05B 3/04; E05B 3/50; E05B 3/003; E05B 3/00; E05B 3/06

USPC .................. 70/224, 416, 141, 417, 418, 462; 292/336.3, 347, 348, 350, 351, 352, 292/355, 358, 359

See application file for complete search history.

(56) References Cited

U.S. PATENT DOCUMENTS

| | | | | |
|---|---|---|---|---|
| 2,961,268 | A * | 11/1960 | Russell et al. | 292/352 |
| 7,581,421 | B2 * | 9/2009 | Don et al. | 70/224 |
| 2005/0126236 | A1 * | 6/2005 | Romero | 70/224 |
| 2007/0180874 | A1 * | 8/2007 | Wang | 70/224 |

* cited by examiner

*Primary Examiner* — Suzanne Barrett
*Assistant Examiner* — Morgan McClure
(74) *Attorney, Agent, or Firm* — Jackson IPG PLLC; Demian K. Jackson

(57) ABSTRACT

A handle assembly of a lock includes a handle, a sleeve, a stopper and an engaging member, wherein the handle comprises an accommodating slot, a lodge hole and a penetrating hole. The sleeve is disposed at the accommodating slot along the direction of a major axis and comprises a through hole. The stopper is disposed at the sleeve and protrudes to the sleeve via the through hole of the sleeve. Owing to the through hole corresponded to the lodge hole, the stopper is lodged in the lodge hole of the handle. The engaging member is disposed in the accommodating slot and adjustably movable along the direction of a transverse axis so that the handle and the sleeve are steadily engaged from each other.

8 Claims, 8 Drawing Sheets

HANDLE ASSEMBLY OF LOCK

FIELD OF THE INVENTION

The present invention is generally related to a handle assembly of a lock, which particularly relates to the handle assembly of the lock utilizing an engaging member to screw in an engaging hole of a handle to make the handle and a sleeve engaged from each other.

BACKGROUND OF THE INVENTION

With reference to FIG. 7, a conventional lock 200 includes a handle 210, a sleeve 220 and a stopper 230, wherein the handle 210 comprises an accommodating chamber 211, and the sleeve 220 is disposed within the accommodating chamber 211. There is an allowance between the sleeve 220 and the handle 210 to prevent the sleeve 220 from getting stuck inside the accommodating chamber 211. The stopper 230 is engaged with the handle 210 and the sleeve 220. When the handle 210 actuates the sleeve 220 to rotate via the stopper 230, the sleeve 220 and the handle 210 are severely swayed via the allowance between the sleeve 220 and the handle 210 therefore resulting in damage of the handle 210, the sleeve 220 or the stopper 230.

Referring to FIG. 7 again, the lock 200 further includes a transmission plate 240 disposed in the sleeve 220. When the transmission plate 240 is rotated toward an unlocked position, a tool 250 is applicable to compress the stopper 230 through a penetration hole 212 of the handle 210 so as to make the stopper 230 separate apart from the handle 210. Therefore, the handle 210 enables to separate apart from the sleeve 220 as well.

With reference to FIG. 8, when the transmission plate 240 is rotated toward a locked position, the transmission plate 240 enables to support the stopper 230 to prevent the tool 250 from compressing the stopper 230 to avoid separation between the handle 210 and the sleeve 220.

With reference to FIG. 8 again, when the stopper 230 is forcibly collided by an external force through the penetration hole 212 of the handle 210, the stopper 230 collides with the transmission plate 240 simultaneously to cause deformation of the transmission plate 240. Therefore, the transmission plate 240 fails to support the stopper 230 after deformation. An intruder may apply the same way to make the handle 210 separate apart from the sleeve 220.

SUMMARY

The primary object of the present invention is to utilize an engaging member screwed in a handle to engage with the handle and a sleeve for making the handle actuate the sleeve to rotate via a stopper and the engaging member so that the sways from the sleeve and the handle can be avoided. Therefore, the damages of the handle, the sleeve or the stopper can be effectively prevented. Besides, the coupling strength between the handle and the sleeve is enhanced by the engaging member.

The other object of the present invention is that the sleeve further comprises a burglarproof member, when a transmission plate is rotated to a locked position, the burglarproof member enables to support the transmission plate to prevent the stopper and the transmission plate collided by an external force from deformation. Therefore, colliding with the stopper and the transmission by an intruder can not separate the handle apart from the sleeve.

A handle assembly of a lock of the present invention includes a handle, a sleeve, a stopper and an engaging member, wherein the handle comprises an accommodating slot, a lodge hole and a penetrating hole. The sleeve comprises a through hole corresponded to the lodge hole and is disposed at the accommodating slot along the direction of a major axis. The stopper comprises a lodge portion and is disposed at the sleeve. The lodge portion penetrates through the through hole of the sleeve, protrudes to the sleeve and being lodged inside the lodge hole of the handle. The engaging member is disposed at the accommodating slot and revealing the penetrating hole. The engaging member is adjustably movable along the direction of a transverse axis so as to engage with the sleeve.

In the present invention, an allowance between the handle and the sleeve is reduced by the engaging member adjustably movable along the direction of the transverse axis therefore making the handle and the sleeve steadily engaged from each other and preventing the sway of the handle while the handle is in operation.

DETAILED DESCRIPTION OF THE INVENTION

Figure 1:
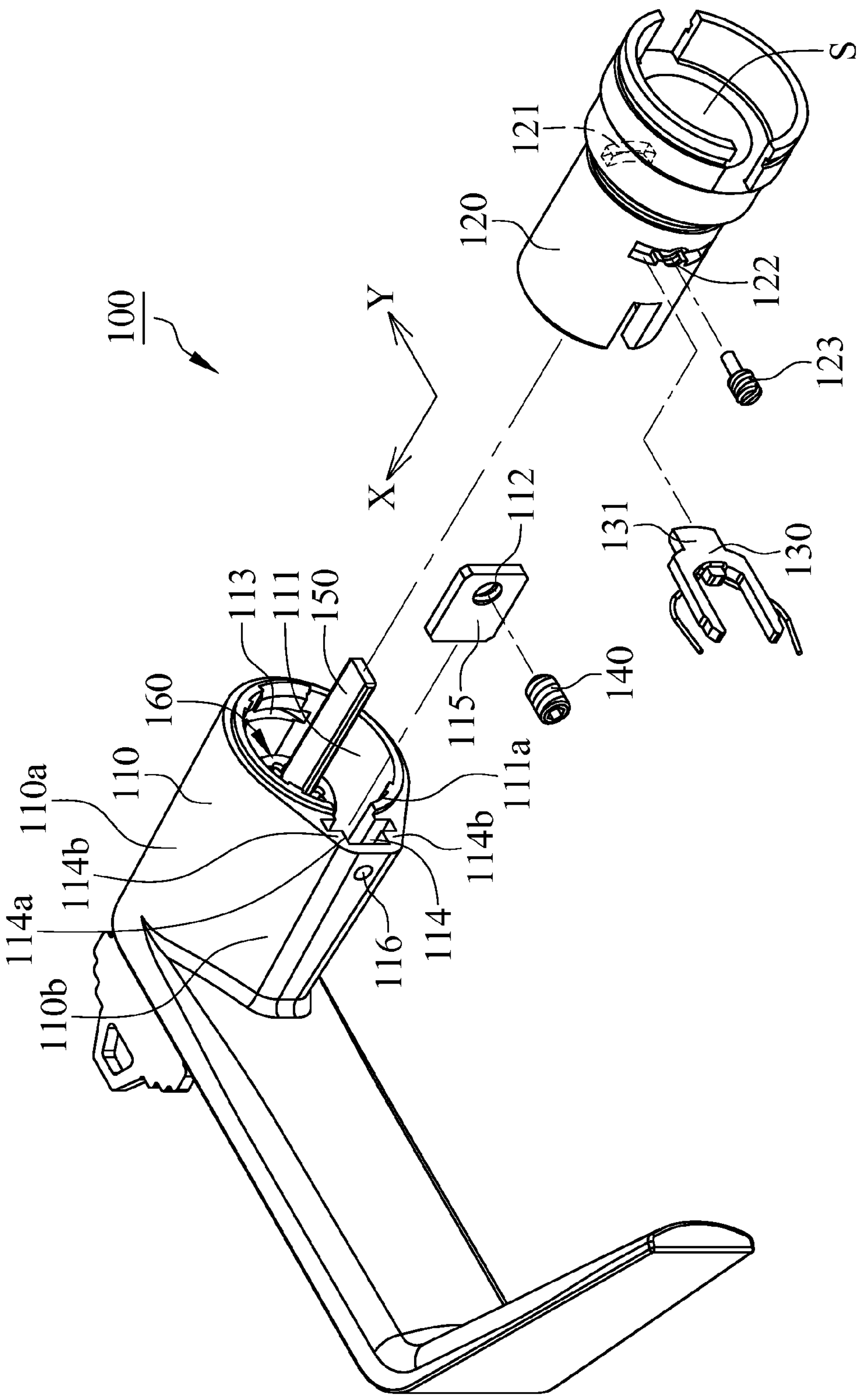
FIG. 1 is a perspective assembly diagram illustrating a handle assembly of a lock in accordance with an embodiment of the present invention.
Figure 2:
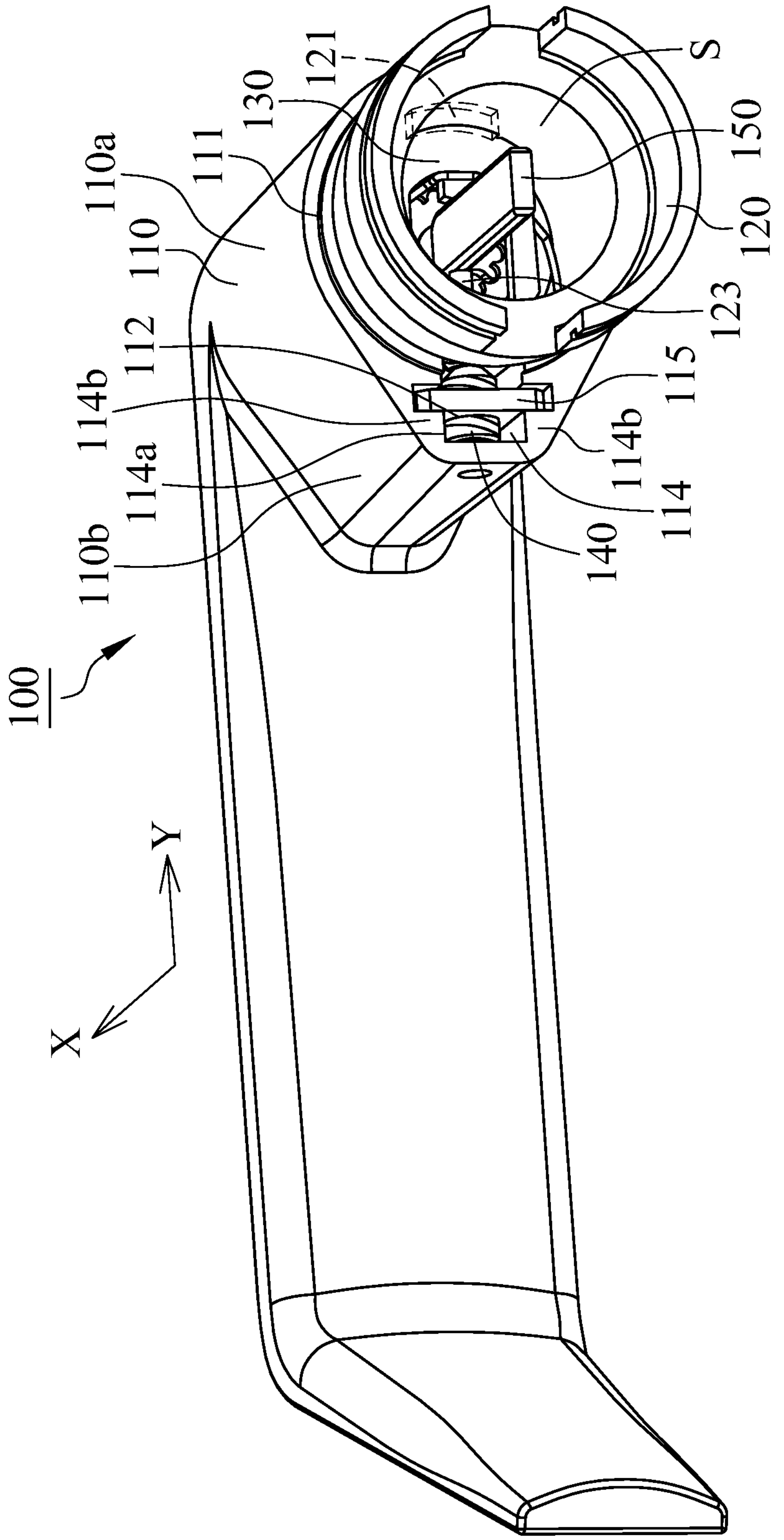
FIG. 2 is a perspective exploded diagram illustrating the handle assembly of a lock in accordance with the embodiment of the present invention.

With reference to FIGS. 1 and 2, a handle assembly of a lock 100 in accordance with an embodiment of the present invention includes a handle 110, a sleeve 120, a stopper 130 and an engaging member 140, wherein the handle 110 comprises a body portion 110*a*, an accommodating slot 111 and a lodge hole 113. The accommodating slot 111 is defined by the body portion 110*a*, and the lodge hole 113 is formed at the body portion 110*a*. The sleeve 120 comprises a through hole 121 corresponded to the lodge hole 113 of the handle 110 and is disposed at the accommodating slot 111 along the direction of a major axis X. The stopper 130 comprises a lodge portion 131 and is disposed at the sleeve 120, wherein the lodge portion 131 penetrates through the through hole 121 of the sleeve 120, protrudes to the sleeve 120 and being lodged in the lodge hole 113 of the handle 110 for mutual engagement between the sleeve 120 and the handle 110.

With reference to FIGS. 1 and 2, the handle 110 further comprises an engaging hole 112 communicated with the accommodating slot 111. The engaging member 140 disposed at the accommodating slot 111 is screwed in the engaging hole 112 and adjustably movable along the direction of a transverse axis Y. In this embodiment, the direction of the transverse axis Y is perpendicular to the direction of the major axis X. The handle 110 further comprises a fixing plate 115, and the engaging hole 112 is formed at the fixing plate 115 along the direction of the transverse axis Y. The fixing plate 115 is integrally formed as one piece with the handle 110, or, the fixing plate 115 and the handle 110 are two individual components engaged with each other. By integrally formed or mutually engaged relationship between the fixing plate 115 and the handle 110, the engaging member 140 engaged with the fixing plate 115 is constrained to move in the engaging hole 112 formed along the direction of the transverse axis Y till the engaging member 140 contacts against the sleeve 120 for engaging with the handle 110 and the sleeve 120. In this embodiment, the sleeve 120 is steadily engaged with the handle 110 via the stopper 130 and the engaging member 140. Besides, the stopper 130 and the engaging member 140 are engaged at various positions of the sleeve 120 and the handle 110 respectively, when the handle 110 actuates the sleeve 120 to rotate via the stopper 130 and the engaging member 140, a swaying condition will not occur to prevent damage of the handle 110, the sleeve 120 or the stopper 130. Additionally, the coupling strength between the handle 110 and the sleeve 120 is enhanced by the engaging member 140.

Figure 3:
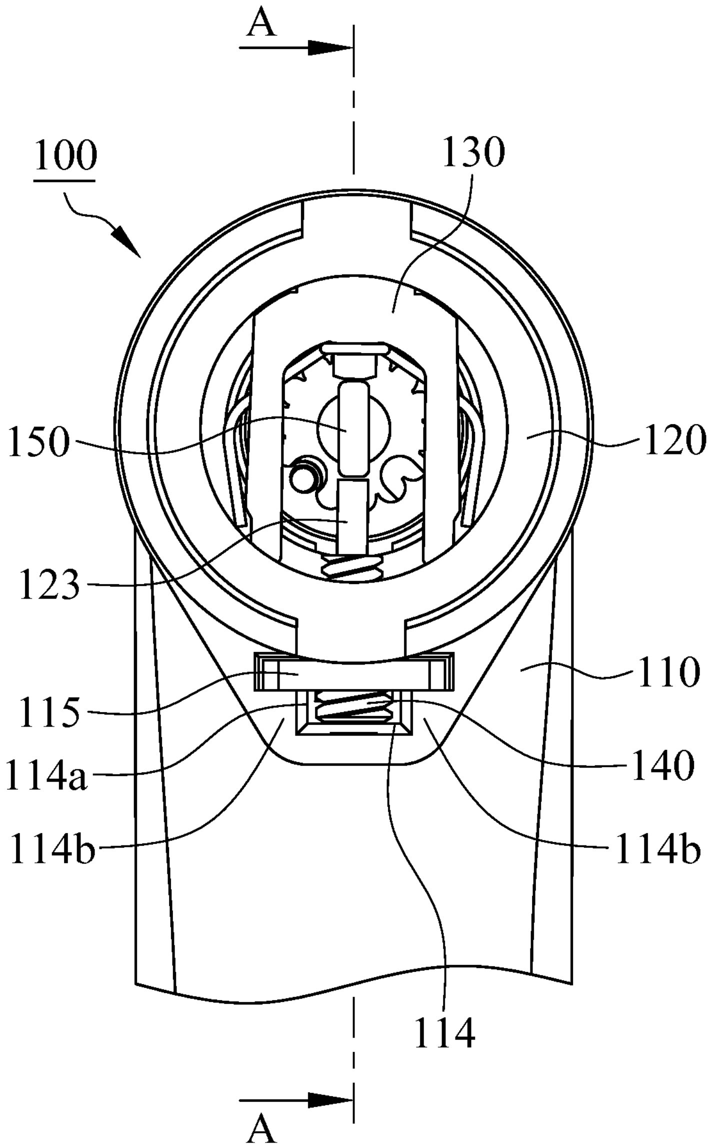
FIG. 3 is a lateral view illustrating the handle assembly of a lock in accordance with the embodiment of the present invention.
Figure 4:
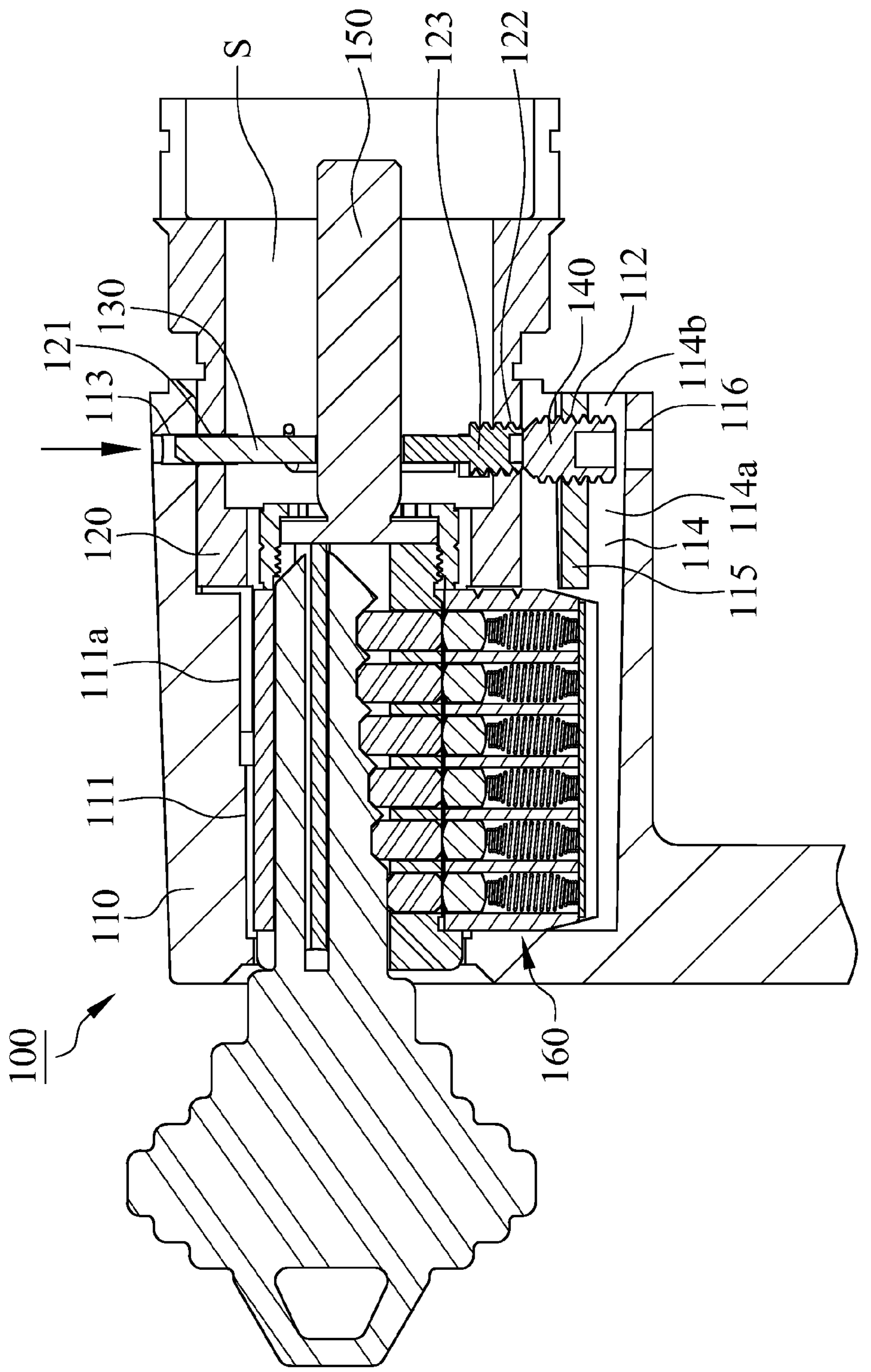
FIG. 4 is a lateral section view along A-A section of FIG. 3.

With reference to FIGS. 2, 3 and 4, in this embodiment, the fixing plate 115 and the handle 110 are two individual components, and the fixing plate 115 enables to separate apart from the handle 110 in order that a lock core 160 is installed into the accommodating slot 111 of the handle 110 smoothly.

With reference to FIGS. 2, 3 and 4, the handle 110 further comprises a neck portion **110*b* and a slot 114, wherein the slot 114 is defined by the neck portion 110*b*, and the neck portion 110*b* is extended from the body portion 110*a* along the direction of the transverse axis Y. When the lock core 160 is installed in the accommodating slot 111 of the handle 110, the fixing plate 115 is thereafter attached into the slot 114 to make the fixing plate 115 integrally engaged with the handle 110 so that the engaging member 140 is engaged with the handle 110 and the sleeve 120**.

With reference to FIGS. 1, 2, 3 and 4, the accommodating slot 111 of the handle 110 comprises a slot wall **111*a*, the slot 114 is recessed from the slot wall 111*a*, and the fixing plate 115 is disposed within the slot 114. In this embodiment, the slot 114 of the handle 110 comprises a lateral wall 114*a* having a bearing portion 114*b*, when the engaging member 140 is screwed in the engaging hole 112, the sleeve 120 is forcibly compressed by the engaging member 140 owing to the fixing plate 115 in contact against the bearing portion 114*b* of the lateral wall 114*a*. The handle 110 is engaged with the sleeve 120 via the engaging member 140 and the fixing plate 115**.

With reference to FIGS. 1, 2 and 4, the handle 110 further comprises a penetrating hole 116 formed at the neck portion **110*b*, communicated with the slot 114 and revealing the engaging member 140. Referring to FIG. 4, in this embodiment, the engaging member 140 is a screw, and the engaging hole 112 is a threaded hole. When one intends to adjust the engaging member 140, a tool (not shown in Figure) is applicable to rotate the engaging member 140 via the penetrating hole 116 to make the engaging member 140 moves forward or backward relative to the fixing plate 115. When the engaging member 140 is rotated to move forward relative to the fixing plate 115, the engaging member 140 contacts against the sleeve 120 to make the handle 110 engaged with the sleeve 120 via the engaging member 140 and the fixing plate 115**.

Furthermore, the length of the engaging member 140 that is protruded to the slot 114 is adjustable by means of the engaging member 140 screwed in the engaging hole 112 therefore making the engaging member 140 applicable to various outer diameters of sleeves.

Otherwise, comparing with the lodge hole 113, the penetrating hole 116 is difficult to be observable from the outline of the handle 110 for forming at the neck portion **110*b* and being concealed by the main body of the handle 110. In this invention, utilizing a tool (not shown in Figure) to compress the stopper 130 by an intruder can not separate the stopper 130 apart from the handle 110. The present invention further possesses another burglarproof device. Only after the engagement state of the engaging member 140 is removed by rotating the engaging member 140 from the penetrating hole 116, the tool is able to compress the stopper 130 via the lodge hole 113 to make the stopper 130 separate apart from the handle 110**.

Figure 5:
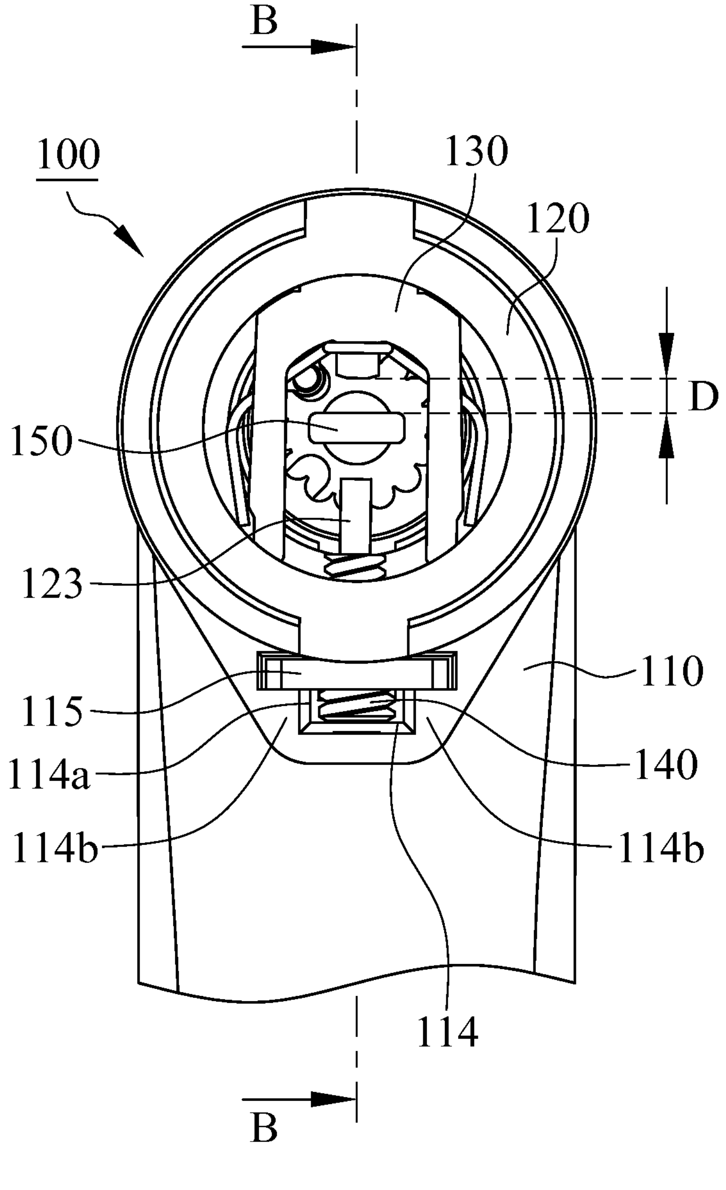
FIG. 5 is a lateral view illustrating the handle assembly of a lock in accordance with the embodiment of the present invention.

With reference to FIGS. 3, 4, 5 and 6, in this embodiment, the handle assembly of the lock 100 further includes a transmission plate 150 engaged with the lock core 160, and the transmission plate 150 is rotatable relative to the lock core 160 between a locked position (FIG. 3) and an unlocked position (FIG. 5) so as to complete lock or unlock actions of the lock. Referring to FIG. 3, the transmission plate 150 is located at the locked position and situated in an erection state. Referring to FIG. 5, the transmission plate 150 is located at the unlocked position and situated in a transverse state.

With reference to FIGS. 1, 2, 4, 5 and 6, the sleeve 120 comprises an accommodating space S, a secured hole 122 and a burglarproof member 123, the transmission plate 150 is disposed at the accommodating space S, and the secured hole 122 is in communication with the accommodating space S. The burglarproof member 123 is screwed in the secured hole 122, protruded to the secured hole 122 and partially located at the accommodating space S. The burglarproof member 123 is utilized for supporting the transmission plate 150 to prevent the transmission plate 150 from deformation or displacement.

Figure 6:
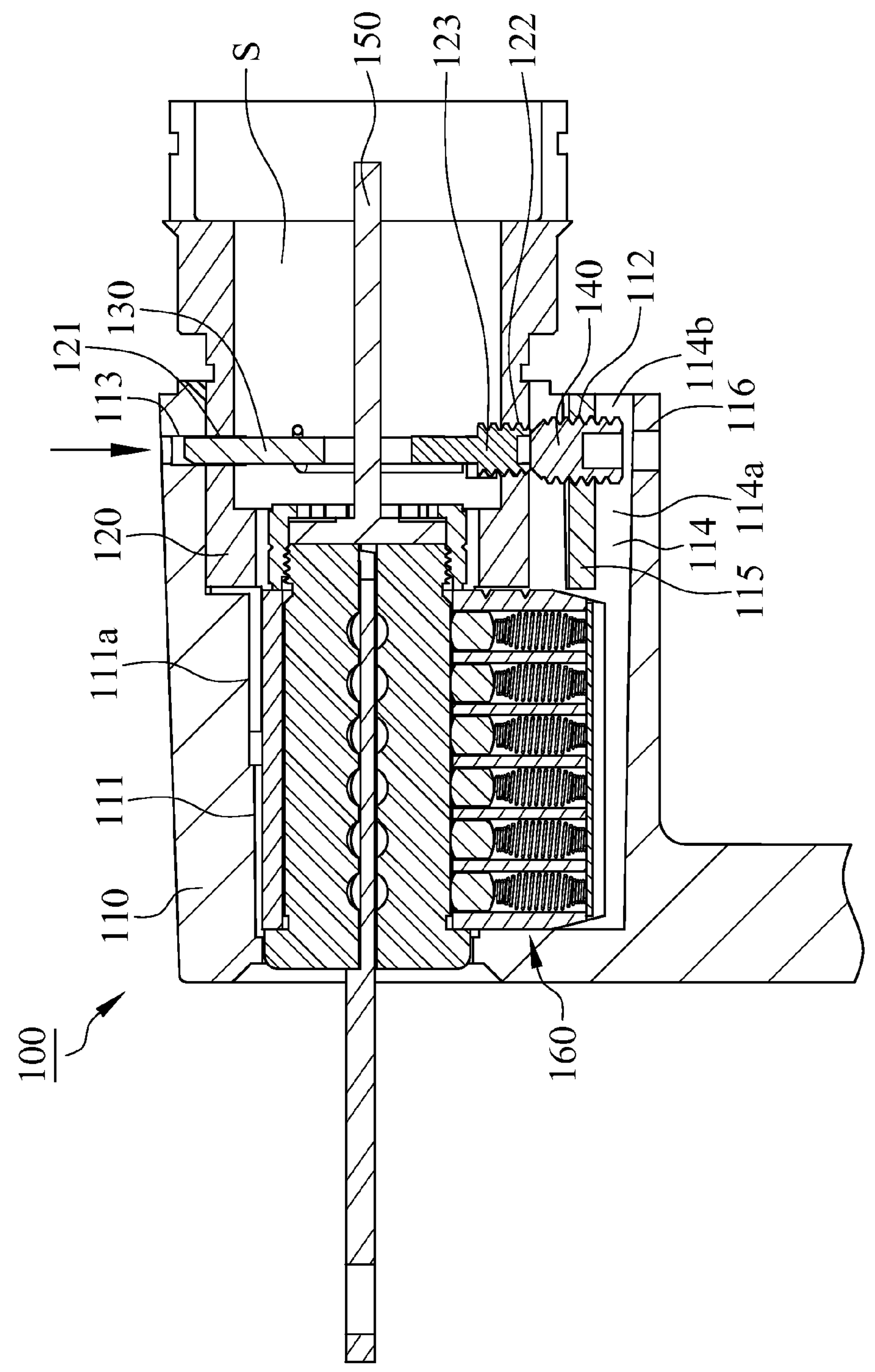
FIG. 6 is a lateral section view along B-B section of FIG. 5.
Figure 7:
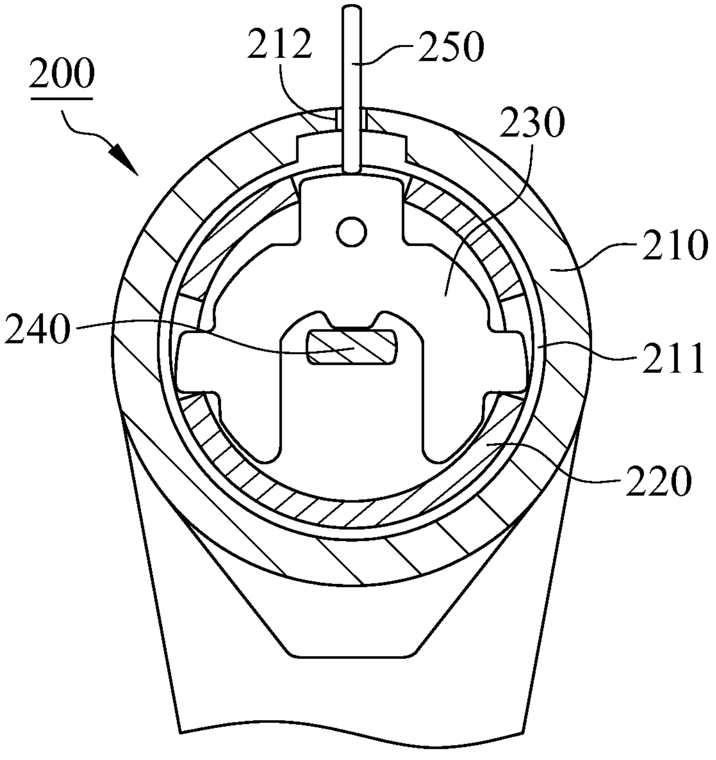
FIG. 7 PRIOR ART
FIG. 7 is a section view of a conventional lock.
Figure 8:
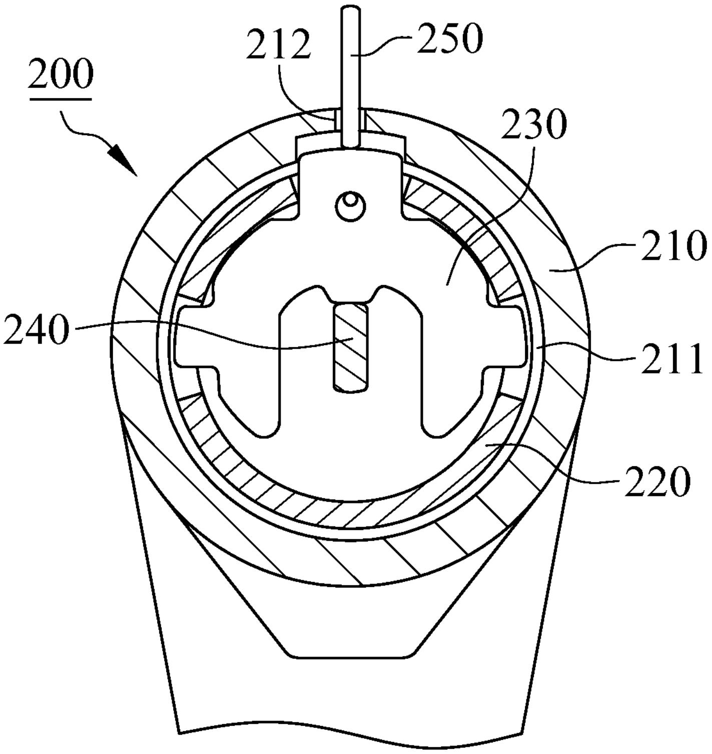
FIG. 8 PRIOR ART
FIG. 8 is a section view of the conventional lock.

With reference to FIGS. 5 and 6, when the transmission plate 150 is located at the unlocked position, a spaced interval D is defined between the transmission plate 150 and a stopper 130. A tool (not shown in Figure) is applicable to contact with and push the stopper 130 via the lodge hole 113 of the handle 110 to make the stopper 130 retracted toward the spaced interval D therefore causing the stopper 130 to separate from the lodge hole 113 of the handle 110. Accordingly, the handle 110 enables to separate apart from the sleeve 120 in order that the lock core 160 or other components can be replaceable with ease.

With reference to FIGS. 3 and 4, when the transmission plate 150 is located at the locked position, the spaced interval D between the transmission plate 150 and a stopper 130 becomes smaller owing to the transmission plate 150 situated in the erection state. Therefore, the stopper 130 can not be compressed to separate apart from the lodge hole 113 of the handle 110 by the tool. In this embodiment, the burglarproof member 123 supports the transmission plate 150, when the stopper 130 is forcibly compressed by an improper external force, the transmission plate 150 will not deform for the reasons that the stopper 130 is supported by the transmission plate 150 and the transmission plate 150 is supported by the burglarproof member 123. Therefore, the function for the transmission plate 150 to support the stopper 130 still maintains. In this embodiment, the engaging member 140 contacts against the burglarproof member 123 of the sleeve 120 and engages with the handle 110 and the sleeve 120.

In this invention, the length of the burglarproof member 123 protruded to the secured hole 122 is adjustable by means of the burglarproof member 123 screwed in the secured hole 122 so that the burglarproof member 123 is applicable to various widths of transmission plates. Additionally, the embodiment of the present invention is installed with mentioned burglarproof member 123 capable of applying to places with higher burglarproof demands, particularly in some public environments such as house entrance or office entrance. However, brining into practice, the present invention enables to provide places having lower burglarproof demands with the lock possessing no burglarproof member 123 upon market requirements. Some places with lower burglarproof demands, such as room doors of residential house, are appropriate to install with the lock possessing no burglarproof member 123.

While this invention has been particularly illustrated and described in detail with respect to the preferred embodiments thereof, it will be clearly understood by those skilled in the art that it is not limited to the specific features and describes and various modifications and changes in form and details may be made without departing from the spirit and scope of this invention.

What is claimed is:

1. A handle assembly of a lock includes:

a handle having an accommodating slot, a lodge hole and a penetrating hole;

a sleeve disposed at the accommodating slot and extending along a major axis of the handle and having a through hole corresponding to the lodge hole;

a stopper disposed at the sleeve and having a lodge portion, wherein the lodge portion penetrates through the through hole of the sleeve, protrudes to the sleeve and is lodged in the lodge hole of the handle and wherein the stopper is movable along a transverse axis, perpendicular to the major axis, so as to engage with the sleeve; and an engaging member disposed at the accommodating slot and revealed by the penetrating hole, the engaging member is adjustably movable along the transverse axis to engage with the sleeve, wherein the handle further comprises a slot and a fixing plate, the slot is in communication with the accommodating slot, the fixing plate is disposed in the slot, wherein an engaging hole is formed at the fixing plate along the transverse axis, and the engaging member is screwed in the engaging hole.

2. The handle assembly of a lock in accordance with claim 1, wherein the handle further comprises a body portion and a neck portion, the accommodating slot is defined by the body portion, the slot is defined by the neck portion, the neck portion is extended from the body portion along the transverse axis, the lodge hole is formed at the body portion, and the penetrating hole is formed at the neck portion.

3. The handle assembly of a lock in accordance with claim 1, wherein the accommodating slot of the handle comprises a slot wall, the slot is recessed from the slot wall and comprises a lateral wall having a bearing portion, the engaging member is disposed at the slot, and the fixing plate contacts against the bearing portion of the lateral wall.

4. The handle assembly of a lock in accordance with claim 1, wherein the engaging member contacts against the sleeve.

5. The handle assembly of a lock in accordance with claim 1, further includes a transmission plate, the sleeve comprises an accommodating space, a secured hole and a burglarproof member, the secured hole communicates with the accommodating space, the burglarproof member is screwed in the secured hole, the transmission plate is disposed at the accommodating space, the transmission plate is rotatable toward a locked position or an unlocked position, when the transmission plate is located at the locked position, the transmission plate is supported by the burglarproof member.

6. The handle assembly of a lock in accordance with claim 5, wherein the engaging member contacts against the burglarproof member of the sleeve.

7. A handle assembly of a lock includes:

a handle having an accommodating slot, a lodge hole and a penetrating hole;

a sleeve disposed at the accommodating slot and extending along a major axis of the handle and having a through hole corresponding to the lodge hole;

a stopper disposed at the sleeve and having a lodge portion, wherein the lodge portion penetrates through the through hole of the sleeve, protrudes to the sleeve and is lodged in the lodge hole of the handle and wherein the stopper is movable along a transverse axis, perpendicular to the major axis, so as to engage with the sleeve; and an engaging member disposed at the accommodating slot and revealed by the penetrating hole, the engaging member is adjustably movable along the transverse axis to engage with the sleeve, wherein the handle assembly of the lock further includes a transmission plate, the sleeve comprises an accommodating space, a secured hole and a burglarproof member, the secured hole communicates with the accommodating space, the burglarproof member is screwed in the secured hole, the transmission plate is disposed at the accommodating space, the transmission plate is rotatable toward a locked position or an unlocked position, when the transmission plate is located at the locked position, the transmission plate is supported by the burglarproof member.

8. The handle assembly of a lock in accordance with claim 7, wherein the engaging member contacts against the burglarproof member of the sleeve.

* * * * *